D. J. McGURK.
GUIDE LIGHT.
APPLICATION FILED AUG. 14, 1918.
1,301,722.
Patented Apr. 22, 1919.
2 SHEETS—SHEET 1.
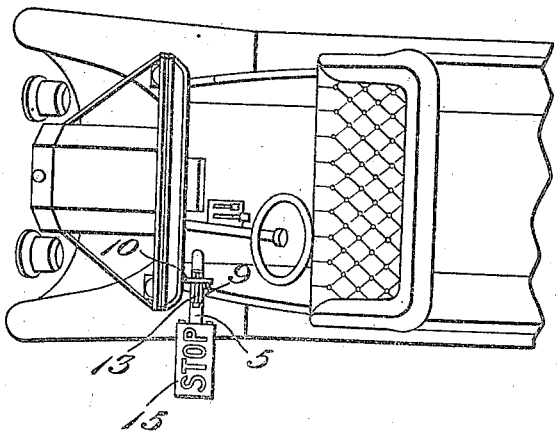
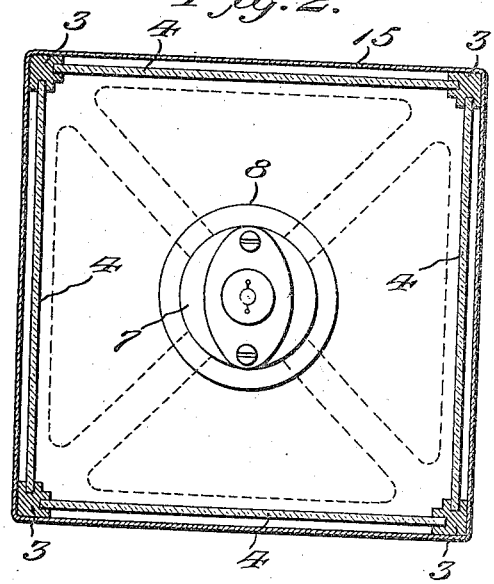
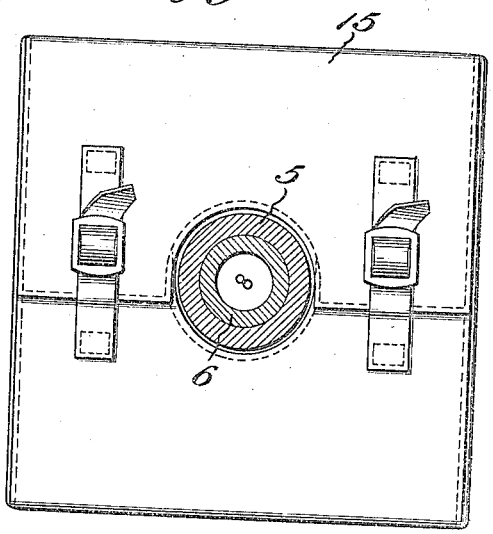
D. J. McGurk Inventor
By Victor J. Evans
Attorney D. J. McGURK.
GUIDE LIGHT.
APPLICATION FILED AUG. 14, 1918.
1,301,722.
Patented Apr. 22, 1919.
2 SHEETS—SHEET 2.
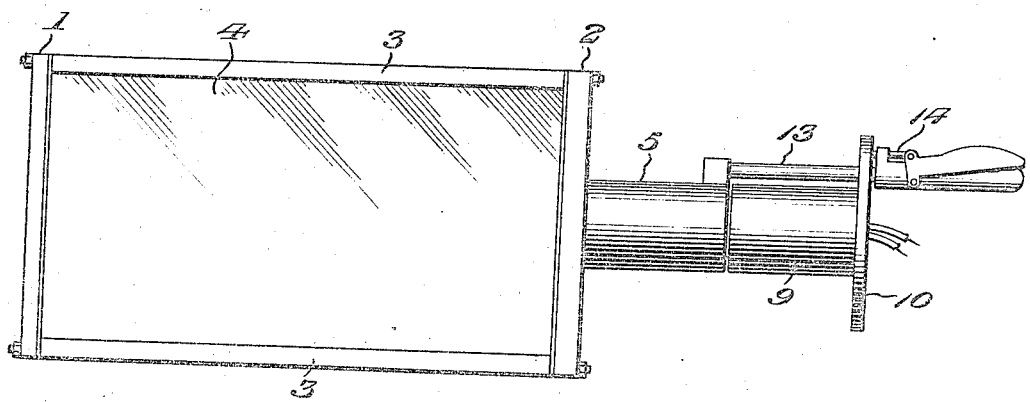
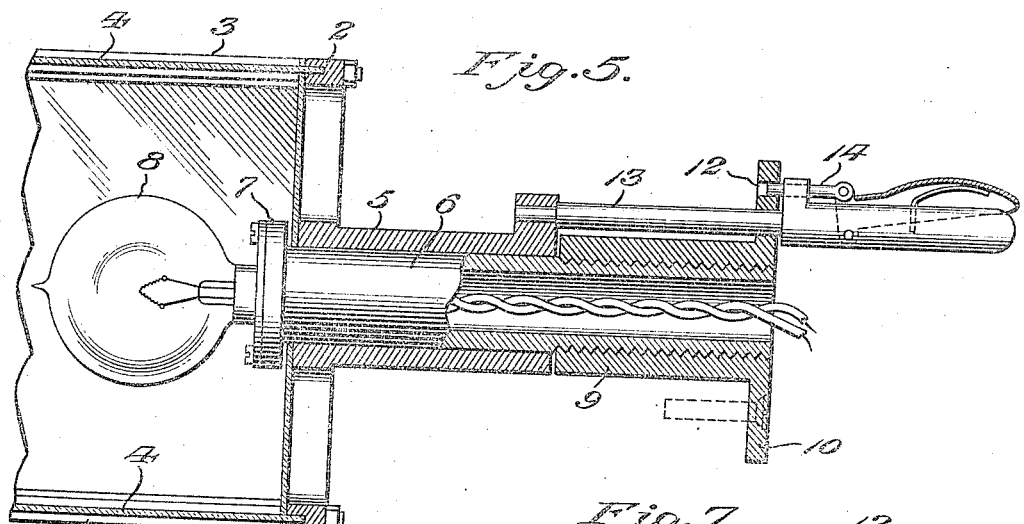
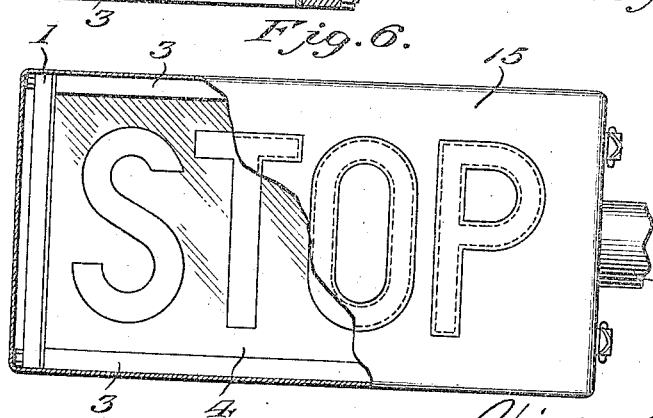
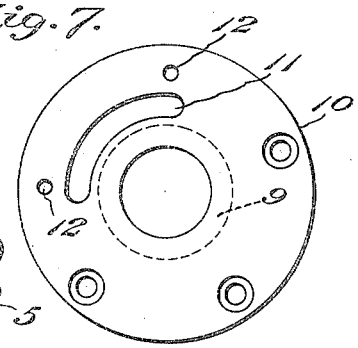
Inventor
D. J. McGurk
By Victor J. Evans
Attorney

UNITED STATES PATENT OFFICE.

DANIEL J. McGURK, OF AKRON, OHIO.

GUIDE-LIGHT.

1,301,722.  Specification of Letters Patent.  Patented Apr. 22, 1919.

Application filed August 14, 1918. Serial No. 249,830.

*To all whom it may concern:*

Be it known that I, DANIEL J. McGURK, a citizen of the United States, residing at Akron, in the county of Summit and State of Ohio, have invented new and useful Improvements in Guide-Lights, of which the following is a specification.

This invention relates to new and useful improvements in signals or guide lights for vehicles, such as automobiles, street cars and the like.

The principal object of the invention is to provide a device having display signals thereon and adapted to be attached to the vehicle for notifying pedestrians and passing vehicles of the intentions of the driver of the vehicle carrying the signal.

Another object of the invention is to provide means for displaying the signal at night as well as during the day and also to provide means for operating the signal from the driver's seat.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a diagrammatic view showing the signal attached to an automobile.

Fig. 2 is a view of the signal with the covering applied thereto whereby the device may be used during the day.

Fig. 3 shows the casing of the signal with the cover removed and with parts in section.

Fig. 4 is a longitudinal section.

Fig. 5 is a view showing the operating means for the signal.

Fig. 6 is a detail view showing the means for attaching the covering.

In these views the signal is shown as made up of a casing 1 formed of the top and bottom plates 2 and the end posts 3, which connects said plates together. These posts are provided with suitable slots for receiving the glass plates 4, which form the sides of the casing. If desired, instead of using glass plates, plates of transparent material may be used such as celluloid. I prefer to color two of these plates green, while the other two are colored red with the plates of like color opposite each other.

The plates colored red are provided with the words "Stop" formed by leaving portions of the plate uncolored. A sleeve 5 is secured to the bottom plate and a hollow shaft 6 passes through said sleeve with its end projecting into the case. This end carries a socket 7 which receives an electric lamp 8. The conducting wires for the socket pass through said shaft and lead to a suitable source of current. The other end of the shaft is screw threaded and receives a screw threaded sleeve 9 which is adapted to be secured to the body of an automobile. Within the body the end of the sleeve has secured thereon a plate 10 having a segmental slot 11 therein and at each end of the slot is formed a recess 12. An operating handle 13 passes through said slot and has its outer end secured to the sleeve 5 so that when the handle is moved in the slot the sleeve will be rotated and thus the casing will be given a quarter turn to expose a new side. This handle is provided with the usual pawl 14, the end of which engages one of the recesses 12 to hold the handle against movement at one or the other end of the slot.

As shown in the drawing, the device will be placed on each side of the automobile between the wind-shield and the hinges of the front doors. However, it will be understood that the device may be differently arranged.

When the device is used during the day I provide a covering 15 for the casing. This covering is preferably made of one strip of cloth colored red which extends over two sides and the outer end of the casing, and two strips of cloth colored green extending over the other two sides of the casing and sewn to the red strip. The ends of the red strip are extended to pass under the inner end plate and these ends are provided with straps and buckles whereby the cover may be secured to the casing. The red strip has letters formed of white material and composing the words "Stop" sewn thereon so that this word will appear on each of the red sides of the casing.

It will thus be seen that the casing can be easily turned to expose the green or red sides thereof to automobiles coming from either direction.

At night the cover is removed and the electric light switched on so that a green and red light will be shown. When the green sides of the casing are in vertical position the red sides will be directly downwardly and upwardly. The rays from the red side will be directed upwardly so that a car coming up on one side of a hill will be notified that a car is approaching from the other side of the hill.

While the device is shown in use on an automobile it will, of course, be understood that it may be used on street cars and other vehicles.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a casing having transparent sides, a sleeve connected to one of the ends of the casing, a hollow shaft passing through said sleeve with its ends projecting into the casing, an electric lamp carried by said end, a screw-threaded sleeve engaging with the outer end of the shaft, a plate on said screw threaded sleeve having a slot and openings therein, some of said openings receiving the supporting screws, a lever passing through the slot and having its end engaging the first mentioned sleeve and a pawl on the lever adapted to engage with a pair of the holes in the plate for holding the casing in its two positions.

In testimony whereof I affix my signature.

DANIEL J. McGURK.

Copies of this patent may be obtained for five cents each, by addressing the "Commissioner of Patents Washington, D. C."